United States Patent [19]

Kuhn

[11] Patent Number: 5,108,829
[45] Date of Patent: Apr. 28, 1992

[54] ANTHRAQUINONE-2-SULFONIC ACID DOPED CONDUCTIVE TEXTILES

[75] Inventor: Hans H. Kuhn, Spartanburg, S.C.

[73] Assignee: Milliken Research Corporation, Spartanburg, S.C.

[21] Appl. No.: 679,746

[22] Filed: Apr. 3, 1991

[51] Int. Cl.$^5$ .......................... B05D 5/12; B32B 27/08; B32B 27/26; B32B 33/00
[52] U.S. Cl. .................................... 428/253; 252/500; 427/121; 427/389.9; 428/272; 428/273; 428/288; 428/290; 428/296; 428/336; 428/392; 428/395; 428/902
[58] Field of Search .......................... 427/121, 389.9; 252/500, 518; 428/253, 272, 273, 288, 290, 296, 336, 392, 395, 902

[56] References Cited

U.S. PATENT DOCUMENTS

| | | | |
|---|---|---|---|
| 4,803,096 | 2/1989 | Kuhn et al. | 427/121 |
| 4,847,115 | 7/1989 | Warren et al. | 427/121 |
| 4,877,646 | 10/1989 | Kuhn et al. | 427/121 |
| 4,933,394 | 6/1990 | Foos | 525/351 X |
| 4,981,718 | 1/1991 | Kuhn et al. | 427/121 |
| 5,030,508 | 7/1991 | Kuhn et al. | 427/121 X |

Primary Examiner—Michael Lusignan
Attorney, Agent, or Firm—Timothy J. Monahan; H. William Petry

[57] ABSTRACT

A textile material, such as fibers, filaments, yarns and fabrics made therefrom, is rendered electrically conductive by a polypyrrole film deposited on the textile material by chemical oxidation of pyrrole in an aqueous solution also containing an oxidizing agent and anthraquinone-2-sulfonic acid as a dopant.

20 Claims, No Drawings

ANTHRAQUINONE-2-SULFONIC ACID DOPED CONDUCTIVE TEXTILES

BACKGROUND OF THE INVENTION

1. Field of the Invention

This invention relates generally to conductive polymers and in particular to an anthraquinone-2-sulfonic acid doped conductive polymer formed on a textile material by chemical oxidation.

2. Prior Art

Electrically conductive textile materials and process for making the same are disclosed in Kuhn et al., U.S. Pat. No. 4,803,096. A textile material is contacted with an aqueous solution of an oxidatively polymerizable pyrrole or aniline compound, an oxidizing agent and a counter ion (doping agent). The pyrrole or aniline compound is oxidized and adsorbed on to the surface of the textile material to form a conductive polymer film. A variety of suitable doping agents are disclosed in the patent, preferably aromatic sulfonic acids such as benzene sulfonic acid and naphthalenedisulfonic acid. Modifications of the foregoing process designed to control the reaction rate by using a ferric salt as an oxidizing agent along with a weak complexing agent for ferric ions, and by using a vanadyl compound as an oxidizing agent are disclosed in Kuhn et al., U.S. Pat. No 4,877,646, and Kuhn et al., U.S. Pat. No. 4,981,718, respectively. One of the drawbacks of the above listed processes is that a relatively high concentration of dopant or counter ion must be present in the aqueous reaction solution in order to achieve high levels of conductivity in the polymer coated fabric.

In addition to chemical oxidation, pyrrole may be electrochemically oxidized to form conductive polypyrole. The effects of various dopants on the conductivity of electrochemically oxidized polypyrole has been the focus of research efforts. Kuwabata et al., EFFECT OF ORGANIC DOPANTS ON ELECTRICAL CONDUCTIVITY OF POLYPYRROLE FILMS, Synthetic Metals, Vol. 18, pp. 101-104 (1987). Kuwataba et al. found that film conductivity is higher for a dopant having a smaller number of sulfonate groups, i.e. anthraquinone-2-sulfonate and naphthalene-2-sulfonate. In a subsequent paper, Kuwataba et al. compared conductivity of the polypyrole films at various current densities used during film preparation. CONDUCTIVITY OF POLYPYROLE FILMS DOPED WITH AROMATIC SULPHONATE DERIVATIVES, J. Chem. Soc., Farraday Trans., Vol. 84(7), pp.2317-2326 (1988). Anthraquinone-2-sulphonate and anthraquinone-2,6-disulfonate were used as dopants with good results, especially at low current densities. Little, if any, difference was found between the various aromatic sulphonate dopants when higher current densities were used in film preparation. Further, the use of anthraquinone sulfonate to dope polyprole prepared by electrochemical oxidation is disclosed in Foos, U.S. Pat. No. 4,933,394 (col.4, line 28-38). However, the behavior of polypyrole prepared by chemical oxidation, especially with regard to the conductivity and stability achieved using a particular dopant, does not parallel that of electrochemically oxidized polypyrole.

SUMMARY OF THE INVENTION

Therefore, one of the objects of this invention is to provide a conductive textile material with high conductivity. Another object of this invention is to provide a conductive textile having a film of polypyrrole deposited thereon. Still another object of this invention is to provide a conductive polymer prepared by chemical oxidation of pyrrole.

According to one embodiment of the present invention, a method is provided for imparting electrical conductivity to textile materials by contacting the textile material with an aqueous solution of an oxidatively polymerizable pyrrole compound and an oxidizing agent capable of oxidizing said pyrrole compound to a polymer, said contacting being carried out in the presence of an anthraquinone-2-sulfonic acid or sulfonate as a counter ion or doping agent to impart electrical conductivity to said polymer, and under conditions at which the pyrrole compound and the oxidizing agent react with each other to form a conductive polymer coating on said textile material.

It is believed that the pyrrole compound and oxidizing agent react to form an in status nascendi forming polymer in said aqueous solution, but without forming a conductive polymer, per se, in said aqueous solution and without either the compound or the oxidizing agent being adsorbed by, or deposited on or in, the textile material. The additional steps are epitaxially depositing onto the surface of the textile material the in status nascendi forming polymer of the polymerizable compound; and allowing the in status nascendi forming compound to polymerize while deposited on the textile material so as to uniformly and coherently cover the textile material with an ordered, conductive film of the polymer.

According to another embodiment of the present invention an electrically conductive textile material is provided which comprises a textile material onto which is deposited a film of an electrically conductive polymer which has been rendered electrically conductive by doping with anthraquinone-2-sulfonic acid.

An advantage of this invention is that a large excess of dopant is not required to achieve high conductivity in the conductive textile material. Another advantage is that in addition to high conductivity, the textile material demonstrates superior stability. The process for preparing the conductive textile material using anthraquinone-2-sulphonate as the dopant features efficient doping at relatively low concentrations of dopant. Based upon the available data, it appears that unlike prior art aromatic sulphonate, an optimum molar ratio of anthraquinone-2-sulphonate to pyrrole in the aqueous reaction mixture is about 1:4. To approach the conductivities realized using anthraquinone-2-sulphonate, with, for example, 2-naphthalene sulphonate as the dopant, the amount of dopant in solution must be increased by a factor of five or better.

In the present invention, the substrate being treated is contacted with the polymerizable compound and oxidizing agent at relatively dilute concentrations and under conditions which do not result in either the monomer or the oxidizing agent being taken up, whether by adsorption, impregnation, absorption, or otherwise, by the preformed fabric (or the fibers, filaments or yarns forming the fabric). Rather, it is believed that the polymerizable monomer and oxidizing reagent will first react with each other to form a "pre-polymer" species, the exact nature of which has not yet been fully ascertained, but which may be a water-soluble or dispersible free radical-ion of the compound, or a water-soluble or dispersible dimer or oligomer of the polymerizable compound, or some other unidentified "pre-polymer" species. In any case, it is the "pre-polymer" species, i.e. the in status nascendi forming polymer, which is epitaxially deposited onto the surface of the individual fibers or filaments, as such, or as a component of yarn or preformed fabric or other textile material. Thus, applicant controls process conditions, such as reaction temperature, concentration of reactants and textile material, and other process conditions so as to result in epitaxial deposition of the pre-polymer particles being formed in the in status nascendi phase, that is, as they are being formed. This results in a very uniform film being formed at the surface of individual fibers or filaments without any significant formation of polymer in solution and also results in optimum usage of the polymerizable compound so that even with a relatively low amount of pyrrole or pyrrole derivative applied to the surface of the textile, nonetheless a relatively high amount of conductivity is capable of being achieved.

DESCRIPTION OF THE PREFERRED EMBODIMENT OF THE INVENTION

As mentioned briefly above it is believed that the in status nascendi forming compound that is epitaxially deposited onto the surface of the textile material. As used herein the phrase "epitaxially deposited" means deposition of a uniform, smooth, coherent and "ordered" film. This epitaxial deposition phenomenon may be said to be related to, or a species of, the more conventionally understood adsorption phenomenon. While the adsorption phenomenon is not necessarily a well known phenomenon in terms of textile finishing operations it certainly has been known that monomeric materials may be adsorbed to many substrates including textile fabrics. The adsorption of polymeric materials from the liquid phase onto a solid surface is a phenomenon which is known, to some extent, especially in the field of biological chemistry. For example, reference is made to U.S. Pat. No. 3,909,195 to Machell, et al. and U.S. Pat. No. 3,950,589 to Togo, et al. which show methods for treating textile fibers with polymerizable compositions, although not in the context of electrically conductive fibers.

Epitaxial deposition of the in status nascendi forming prepolymer of pyrrole or pyrrole derivatives is caused to occur, according to the present invention, by, among other factors, controlling the type and concentration of polymerizable compound in the aqueous reaction medium. If the concentration of polymerizable compound (relative to the textile material and/or aqueous phase) is too high, polymerization may occur virtually instantaneously both in solution and on the surface of the textile material and a black powder, e.g. "black polypyrrole", will be formed and settle on the bottom of the reaction flask. If, however, the concentration of polymerizable compound, in the aqueous phase and relative to the textile material, is maintained at relatively low levels, for instance, depending on the particular oxidizing agent, from about 0.01 to about 15 grams of polymerizable compound per 50 grams of textile material in one liter of aqueous solution, preferably from about 1.5 to about 2.5 grams polymerizable compound per 50 grams textile per liter, polymerization occurs at a sufficiently slow rate, and the prepolymer species will be epitaxially deposited onto the textile material before polymerization is completed. Reaction rates may be further controlled by variations in other reaction conditions such as reaction temperatures, etc. and other additives. This rate is, in fact, sufficiently slow that it may take several minutes, for example 2 to 5 minutes or longer, until a significant change in the appearance of the reaction solution is observed. If a textile material is present in this in status nascendi forming solution of pre-polymer, the forming species, while still in solution, or in colloidal suspension will be epitaxially deposited onto the surface of the textile material and a uniformly coated textile material having a thin, coherent, and ordered conductive polymer film on its surface will be obtained.

The films are either transparent or semi-transparent because the films are, in general, quite thin and one can directly conclude from the intensity of the color observed under the microscope the relative thickness of the film. In this regard, it has been calculated that film thickness may range from about 0.05 to about 3 microns, preferably from 0.1 to about 1 micron. Further, microscopic examination of the films show that the surface of the films is quite smooth.

The disclosure in Kuhn et al., U.S. Pat. Nos. 4,975,317, 4,877,646 and 4,981,718 provides a general description of the procedures for making conductive textiles, as well as procedures for controlling the rate of reaction and ordering of the conductive polymer films, and are hereby incorporated by reference.

In general, the weight of textile material per weight of aqueous liquor may be from about 1 to 5 to 1 to 50 preferably from about 1 to 10 to about 1 to 20.

Controlling the rate of the in status nascendi forming polymer deposition epitaxially on the surface of the fibers in the textile material is not only of importance for controlling the reaction conditions to optimize yield and proper formation of the polymer on the surface of the individual fiber but foremost influences the molecular weight and order of the epitaxially deposited polymer. Higher molecular weight and higher order in electrically conductive polymers imparts higher conductivity and most importantly higher stability to these products.

Pyrrole is the preferred pyrrole monomer, both in terms of the conductivity of the doped polypyrrole films and for its reactivity. However, other pyrrole monomers, including N-methylpyrrole, 3-methylpyrrole, 3,5-dimethylpyrrole, 2,2-bipyrrole, and the like, especially N-methylpyrrole can also be used More generally, the pyrrole compound may be selected from pyrrole, 3-, and 3,4-alkyl and aryl substituted pyrrole, and N-alkyl, and N-aryl pyrrole. In addition, two or more pyrrole monomers can be used to form conductive copolymer, especially those containing predominantly pyrrole, especially at least 50 mole percent, preferably at least 70 mole percent, and especially preferably at least 90 mole percent of pyrrole. In fact, the addition of a pyrrole derivative as comonomer having a lower polymerization reaction rate than pyrrole may be used to effectively lower the overall polymerization rate. Use of other pyrrole monomers, is, however, not preferred, particularly when especially low resistivity is desired, for example, below about 1,000 ohms per square.

Ferric chloride is the preferred oxidizing agent. However, any of the known oxidizing agents for promoting the polymerization of polymerizable monomers may be used in this invention, including, for example, the chemical oxidants and the chemical compounds containing a metal ion which is capable of changing its valence, which compounds are capable, during the polymerization of the polymerizable compound, of providing electrically conductive polymers, including those listed in the following patents U.S. Pat. No. 4,604,427 to Roberts, et al., U.S. Pat. No. 4,521,450 to Bjorklund, et al. and U.S. Pat. No. 4,617,228 to Newman, et al.

Specifically, suitable chemical oxidants include, for instance, compounds of polyvalent metal ions, such as, for example, $FeCl_3$, $Fe_2(SO_4)_3$, $K_3(Fe(CN)_6)$, $H_3PO_2 \cdot 1 \cdot 2MoO_3$, $H_3PO_4 \cdot 12WO_3$, $CrO_3$, $(NH_4)_2Ce(NO_3)_6$, $CuCl_2$, $AgNO_3$, etc., and compounds not containing polyvalent metal compounds, such as nitrites, quinones, peroxides, peracids, persulfates, perborates, permanganates, perchlorates, chromates, and the like. Examples of such non-metallic type of oxidants include, for example, $HNO_3$, 1,4-benzoquinone, tetrachloro-1, 4-benzoquinone, hydrogen peroxide, peroxyacetic acid, peroxybenzoic acid, 3-chloroperoxybenzoic acid, ammonium persulfate, ammonium perborate, etc. The alkali metal salts, such as sodium, potassium or lithium salts of these compounds, can also be used.

Since it is only the "doped" polypyrole that is electrically conductive, it is necessary to supply a doping agent or counter ion. Anthraquinone-2-sulfonic acid or its sodium salt has been found to be a superior doping agent when used in the chemical oxidation of a pyrrole compound to produce a conductive textile fabric. Unlike prior art doping agents, anthraquinone-2-sulfonic acid demonstrates optimum performance, measured by conductivity, stability and degree of doping (sulfur count) in the final product, at relatively low concentrations in the aqueous reaction solution. For example, in a reaction solution having 4 wt.% pyrrole monomer based upon the weight of fabric to be treated, 15 excellent results were achieved with concentrations of from 2 to 10 wt.% anthraquinone-2-sulfonic acid based upon the weight of the fabric. Although a greater amount of anthraquinone-2-sulfonic acid may be employed, it is believed that unlike prior art dopants, not only does one see diminishing returns with an increase in dopant but a peak performance is seen with less than 10 wt% dopant based upon the weight of the fabric. Preferably, the ratio of the weight of anthraquinone-2-sulfonic acid to pyrrole monomer is in the range of from 1:3 to 3:1, and more preferably from 1:2 to 2.5:1. In the final product, the degree of doping should be between 33% and 75% or in other words, the molar ratio of anthraquinone-2-sulfonic acid to pyrrole in the conductive polymer should be from about 1:3 to 3:4.

When anthraquinone-2-sulfonic acid is used in conjunction with, for example, hydrogen peroxide, or one of the other non-metallic chemical oxidants, in addition to high conductivity of the resulting polymer films, there is a further advantage that the reaction can be carried out in conventional stainless steel vessels. In contrast, $FeCl_3$ oxidant is highly corrosive to stainless steel and requires glass or other expensive specialty metal vessels or lined vessels. Moreover, the peroxides, persulfates, etc. have higher oxidizing potential than $FeCl_3$ and can increase the rate of polymerization of the compound.

Generally, the amount of oxidant is a controlling factor in the polymerization rate and the total amount of oxidant should be at least equimolar to the amount of the monomer. However, the amount of oxidant may be substantially greater, for example, a molar ratio of oxidant to polymerizable compound of from about 4:1 to about 1:1, preferably 3:1 to 2:1. It may be useful to use a lower amount of the chemical oxidant to control the rate of polymerization or to assure effective utilization of the polymerizable monomer.

Within the amounts of polymerizable compound and oxidizing agent as described above, the conductive polymer is formed on the fabric in amounts corresponding to about 0.5% to about 4%, preferably about 1.0% to about 3%, especially preferably about 1.5% to about 2.5%, such as about 2%, by weight based on the weight of the fabric. Thus, for example, for a fabric weighing 100 grams a polymer film of about 2 gm may typically be formed on the fabric.

Furthermore, the rate of polymerization of the polymerizable compound can be controlled by variations of the pH of the aqueous reaction mixture. While solutions of ferric chloride are inherently acidic, increased acidity can be conveniently provided by acids such as HCl or $H_2SO_4$, in addition to the doping agent or counter ion, anthraquinone-2 sulfonic acid. It has been found that pH conditions from about five to about one provide sufficient acidity to allow the in status nascendi epitaxial adsorption of the polymerizable compound to proceed. Preferred conditions, however, are encountered at a pH of from about three to about one.

Another important factor in controlling the rate of polymerization (and hence formation of the prepolymer adsorbed species) is the reaction temperature. As is generally the case with chemical reactions, the polymerization rate will increase with increasing temperature and will decrease with decreasing temperature. For practical reasons it is convenient to operate at or near ambient temperature, such as from about 10° C. to 30° C., preferably from about 18° C. to 25° C. At temperatures higher than about 30° C., for instance at about 40° C. or higher, the polymerization rate becomes too high and exceeds the rate of epitaxial deposition of the in status nascendi forming polymer and also results in production of unwanted oxidation by-products. At temperatures below about 10° C., the polymerization rate becomes slower but a higher degree of order and therefore better conductivities can be obtained. The polymerization of the polymerizable compound can be performed at temperatures as low as about 0° C. (the freezing temperature of the aqueous reaction media) or even lower where freezing point depressants, such as various electrolytes, including the metallic compound oxidants and doping agents, are present in the reaction system. The polymerization reaction must, of course, take place at a temperature above the freezing point of the aqueous reaction medium so that the prepolymer species can be epitaxially deposited onto the textile material from the aqueous reaction medium.

Yet another controllable factor which has significance with regard to the process of the present invention is the rate of deposition of the in status nascendi forming polymer on the textile material. The rate of deposition of the polymer to the textile fabric should be such that the in status nascendi forming polymer is taken out of solution and deposited onto the textile fabric as quickly as it is formed. If, in this regard, the polymer or pre-polymer species is allowed to remain in solution too long, its molecular weight may become so high that it may not be efficiently deposited but, instead, will form a black powder which will precipitate to the bottom of the reaction medium.

The rate of epitaxial deposition onto the textile fabric depends, inter alia, upon the concentration of the species being deposited and also depends to some degree on the physical and other surface characteristics of the textile material being treated. The rate of deposition, furthermore, does not necessarily increase as concentrations of the polymeric or prepolymer material in the solution increase. On the contrary, the rate of epitaxial deposition of the in status nascendi forming polymer material to a solid substrate in a liquid may actually increase as concentration of the material increases to a maximum and then as the concentration of the material increases further the rate of epitaxial deposition may actually decrease as the interaction of the material with itself to make higher molecular weight materials becomes the controlling factor.

Deposition rates and polymerization rates may be influenced by still other factors. For instance, the presence of surface active agents or other monomeric or polymeric materials in the reaction medium may interfere with and/or slow down the polymerization rate. It has been observed, for example, that the presence of even small quantities of nonionic and cationic surface active agents almost completely inhibit formation on the textile material of the electrically conductive polymer whereas anionic surfactants, in small quantities, do not interfere with film formation or may even promote formation of the electrically conductive polymer film. With regard to deposition rate, the addition of electrolytes, such as sodium chloride, calcium chloride, etc. may enhance the rate of deposition.

The deposition rate also depends on the driving force of the difference between the concentration of the adsorbed species on the surface of the textile material and the concentration of the species in the liquid phase exposed to the textile material. This difference in concentration and the deposition rate also depend on such factors as the available surface area of the textile material exposed to the liquid phase and the rate of replenishment of the in status nascendi forming polymer in the vicinity of the surfaces of the textile material available for deposition.

Therefore, it follows that best results in forming uniform coherent conductive polymer films on the textile material are achieved by continuously agitating the reaction system in which the textile material is in contact during the entire polymerization reaction. Such agitation can be provided by simply shaking or vibrating or tumbling the reaction vessel in which the textile material is immersed in the liquid reactant system or alternatively, the liquid reactant system can be caused to flow through and/or across the textile material.

As an example of this later mode of operation, it is feasible to force the liquid reaction system over and through a spool or bobbin of wound textile filaments, fibers (e.g. spun fibers), yarn or fabrics, the degree of force applied to the liquid being dependent on the winding density, a more tightly wound and thicker product requiring a greater force to penetrate through the textile and uniformly contact the entire surface of all of the fibers or filaments or yarn. Conversely, for a loosely wound or thinner yarn or filament package, correspondingly less force need be applied to the liquid to cause uniform contact and deposition. In either case, the liquid can be recirculated to the textile material as is customary in many types of textile treating processes. Yarn packages up to 10 inches in diameter have been treated by the process of this invention to provide uniform, coherent, smooth polymer films. The observation that no particulate matter is present in the coated conductive yarn package provides further evidence that it is not the polymer particles, per se which are water-insoluble and which, if present, would be filtered out of the liquid by the yarn package, that are being deposited onto the textile material.

As an indication that the polymerization parameters, such as reactant concentrations, temperature, and so on, are being properly maintained, such that the rate of epitaxial deposition of the in status nascendi forming polymer is sufficiently high that polymer does not accumulate in the aqueous liquid phase, the liquid phase should remain clear or at least substantially free of particles visible to the naked eye throughout the polymerization reaction.

One particular advantage of the process of this invention is the effective utilization of the polymerizable monomer. Yields of pyrrole polymer, for instance, based on pyrrole monomer, of greater than 50%, especially greater than 75%, can be achieved.

When the process of this invention is applied to textile fibers, filaments or yarns directly, whether by the above-described method for treating a wound product, or by simply passing the textile material through a bath of the liquid reactant system until a coherent uniform conductive polymer film is formed, or by any other suitable technique, the resulting composite electrically conductive fibers, filaments, yarns, etc. remain highly flexible and can be subjected to any of the conventional knitting, weaving or similar techniques for forming fabric materials of any desired shape or configuration, without impairing the electrical conductivity.

Furthermore, another advantage of the present invention is that the rate of oxidative polymerization can be effectively controlled to a sufficiently low rate to obtain desirably ordered polymer films of high molecular weight to achieve increased stability, for instance against oxidative degradation in air. Thus, as described above, reaction rates can be lowered by lowering the reaction temperature, by lowering reactant concentrations (e.g. using less polymerizable compound, or more liquid, or more fabric), by using different oxidizing agents, by increasing the pH, or by incorporating additives in the reaction system.

While the precise identity of the adsorbing species has not been identified with any specificity, certain theories or mechanisms have been advanced although the invention is not to be considered to be limited to such theories or proposed mechanisms. It has thus been suggested that in the chemical or electrochemical polymerization, the monomer goes through a cationic, free radical ion stage and it is possible that this species is the species which is adsorbed to the surface of the textile fabric. Alternatively, it may be possible that oligomers or pre-polymers of the monomers are the species which are deposited onto the surface of the textile fabric.

A wide variety of textile materials may be employed in the method of the present invention, for example, fibers, filaments, yarns and various fabrics made therefrom. Such fabrics may be woven or knitted fabrics and are preferably based on synthetic fibers, filaments or yarns. In addition, even non-woven structures, such as felts or similar materials, may be employed. Preferably, the polymer should be epitaxially deposited onto the entire surface of the textile. This result may be achieved, for instance, by the use of a relatively loosely woven or knitted fabric but, by contrast, may be relatively difficult to achieve if, for instance, a highly twisted thick yarn were to be used in the fabrication of the textile fabric. The penetration of the reaction medium through the entire textile material is, furthermore, enhanced if, for instance, the fibers used in the process are texturized textile fibers.

Fabrics prepared from spun fiber yarns as well as continuous filament yarns may be employed. In order to obtain optimum conductivity of a textile fabric, however, it may be desirable to use continuous filament yarns so that a film structure suitable for the conducting of electricity runs virtually continuously over the entire surface of the fabric. In this regard, it has been observed, as would be expected, that fabrics produced from spun fibers processed according to the present invention typically show somewhat less conductivity than fabrics produced from continuous filament yarns.

A wide variety of synthetic fibers may be used to make the textile fabrics of the present invention. Thus, for instance, fabric made from synthetic yarn, such as polyester, nylon and acrylic yarns, may be conveniently employed. Blends of synthetic and natural fibers may also be used, for example, blends with cotton, wool and other natural fibers may be employed. The preferred fibers are polyester, e.g. polyethylene terephthalate including cationic dyeable polyester and polyamides, e.g. nylon, such as Nylon 6, Nylon 6,6, and so on. Another category of preferred fibers are the high modulus fibers such as aromatic polyester, aromatic polyamide and polybenzimidazole. Still another category of fibers that may be advantageously employed include high modulus inorganic fibers such as glass and ceramic fibers. Although it has not been clearly established, it is believed that the sulfonate groups or amide groups present on these polymers may function as a "built-in" doping agent.

Conductivity measurements have been made on the fabrics which have been prepared according to the method of the present invention. Standard test methods are available in the textile industry and, in particular, AATCC test method 76-1987 is available and has been used for the purpose of measuring the resistivity of textile fabrics. According to this method, two parallel electrodes 2 inches long are contacted with the fabric and placed 1 inch apart. Resistivity may then be measured with a standard ohm meter capable of measuring values between 1 and 20 million ohms. Measurements must then be multiplied by 2 in order to obtain resistivity in ohms on a per square basis. While conditioning of the samples may ordinarily be required to specific relative humidity levels, it has been found that conditioning of the samples made according to the present invention is not necessary since conductivity measurements do not vary significantly at different humidity levels. The measurements reported in the following example are, however, conducted in a room which is set to a temperature of 70° F. and 50% relative humidity. Resistivity measurements are reported herein and in the examples in ohms per square ($\Omega$/sq) and under these conditions the corresponding conductivity is one divided by resistivity.

Various procedures can be used to perform the method of preparation of a conductive fabric as it applies to the invention by operating within the parameters as described above. Typical methods are described below:

Method A

An 8 ounce jar is charged with 5 grams of a textured woven polyester fabric consisting of a 2×2 right hand twill weighing approximately 6.6 ounces per square yard and being constructed from a 2/150/34 textured polyester yarn from Celanese Type 667 having approximately 70 ends and 55 picks. First 50 cc of water is added to the jar and the jar is closed and the fabric properly wetted out with the initial water charge. 2.9 grams of ferric chloride solution (photoengraving grade from Park Chemical Company 38.8% active ingredient) is dissolved in approximately 50 cc of water and the jar is closed and shaken again to obtain an appropriate mixture. 0.2 grams of pyrrole is dissolved together with the necessary doping agent (expressed in percent on weight of fabric) and added to the jar. The jar is first shaken by hand for a short period of time and then put in a rotating clamp and rotated at approximately 60 rpm for a total of 4 hours. The fabric is withdrawn, rinsed 3 times with water and air dried. Instead of the above mentioned textured polyester fabric an equal weight of 100% S-2 fiberglass fabric weighing 8.8 ounces per square yard in a satin weave from J. P. Stevens industrial fabrics can be used. In order to withstand the mechanical agitation this fabric has to be sewn with a light cotton thread on all four sides. Unless reported differently, all experiments are conducted under room temperature conditions.

Conductive fabric prepared according to the procedures disclosed herein was tested using the following procedures:

Conductivity

Conductivity measurements were made on the conductive fabric according to standard test method AATCC, Method 76-1987 as set forth in greater detail above.

Stability

A 2×2 inch specimen of fabric is cut from the samples reported and the resistance $R_o$ is determined. The sample is then hung in a constant temperature oven with forced air circulation for 30 hours and the specimen is measured for its area resistance again, $R_x$. The stability is expressed by the ration $R_o/R_x$, which multiplied by 100, would represent the percentage of the conductivity retained after heating.

Sulfur Counts per Second

Samples were run on a Kevex Delta-Analyst x-ray fluorescence analyzer system. Tube voltage was 20.0 kV, and current set at 3.0 mA. Tube radiation was from a rhodium anode, and excitation of samples was performed using a secondary target of titanium. Each spectrum collected had a range of 0-10 KeV, and acquisition was for 100 seconds (live time). Counts were determined by performing a Gaussian deconvolution of the peak region specific for sulfur. Output was displayed as total counts specific to the (above mentioned) sulfur region, for each sample.

The invention may be further understood by reference to the following examples, but the invention is not to be construed as being limited thereby. Unless otherwise indicated, all parts and percentages are by weight.

EXAMPLE 1

A conductive textile material was prepared according to Method A using polyester fabric and anthraquinone-2-sulfonic acid as a dopant.

The results are set forth below in Table 1.

| Run Number | Amount of Dopant (wt % based on wt. of fabric) | Resistance Ohms/Square | Sulfur Cts/Sec | Stability $R_o/R_x$ |
| --- | --- | --- | --- | --- |
| 1 | 2 | 50 | 102 | .63 |
| 2 | 4 | 46 | 136 | .65 |
| 3 | 5 | 41 | 145 | .65 |
| 4 | 6 | 48 | 159 | .66 |
| 5 | 7.5 | 56 | 172 | .72 |
| 6 | 10 | 60 | 148 | .65 |

These experiments show the unusual response in respect to the resistance values obtained, 41–48 ohms/square, with the low amounts of dopant.

EXAMPLE 2

These samples were prepared according to Method A using a variety of multiple ring, aromatic sulfonic acids as the dopant, at amounts of 10% on the weight of the fabric.

| Run No. | Dopant | Resistance Ohms/square | $R_o/R_x$ | Sulfur Count/Sec. |
| --- | --- | --- | --- | --- |
| 7 | Anthraquinone-2-sulfonic acid | 56 | .62 | 148 |
| 8 | Anthraquinone-1-sulfonic acid | 150 | .59 | 107 |
| 9 | Anthraquinone-2,6-disulfonic acid | 102 | .27 | 209 |

This shows the superior performance of anthraquinone-2-sulfonic acid over other modifications in position and number of sulfonic acids as evidenced by the unusually high sulfur count the high conductivity and good stability.

EXAMPLE 3

Samples were prepared according to Method A using polyester fabric and 2-naphthalene sulfonic acid as the dopant.

| Run Number | Amount of Dopant (wt % based on wt. of fabric) | Resistance Ohms/Square | Sulfur Cts/Sec |
| --- | --- | --- | --- |
| 10 | 1 | 185 | 38 |
| 11 | 2 | 138 | 48 |
| 12 | 4 | 90 | 61 |
| 13 | 6 | 81 | 87 |
| 14 | 8 | 72 | 95 |
| 15 | 10 | 71 | 97 |
| 16 | 15 | 64 | n.a. |

These experiments show the typical behavior of a multiring aromatic, mono-sulfonic acid dopant whereby conductivity continues to improve as the level of dopant in the reaction solution increases. In contrast, Runs No. 1–6 using anthraquinone-2-sulfonic acid show that peak conductivity is obtained at dopant amounts of 4–6 weight percent based upon the weight of fabric.

EXAMPLE 4

These samples were prepared according to Method A using polyester fabric for a number of different dopants at both low and high loading levels.

| Run No. | Dopant Used | Amount of Dopant (wt % based on wt. of fabric) | Resistance Ohms/Sq. | Stability $R_o/R_x$ |
| --- | --- | --- | --- | --- |
| 17 | Benzene sulfonic acid | 10% | 522 | .16 |
| 18 | Benzene sulfonic acid | 100% | 176 | .25 |
| 19 | p-chlorobenzene sulfonic acid | 10% | 172 | .32 |
| 20 | p-chlorobenzene sulfonic acid | 100% | 55 | .57 |
| 21 | p-toluene sulfonic acid | 10% | 240 | .24 |
| 22 | p-toluene sulfonic acid | 100% | 78 | .45 |
| 23 | p-ethyl benzene sulfonic acid | 10% | 145 | .36 |
| 24 | p-ethyl benzene sulfonic acid | 100% | 60 | .65 |
| 25 | *2-naphthalene sulfonic acid | 10% | 71 | .62 |
| 26 | 1,5 naphthalene di-sulfonic acid | 10% | 89 | .39 |
| 27 | 1,5 napthalene di-sulfonic acid | 100% | 74 | .38 |

*Found not to be soluble in the reaction solution in amounts of 100 weight percent based on the weight of the fabric.

This shows again the typical behavior of various aromatic sulfonic acids as a function of doping, i.e., the lowest resistance possible is obtained with excessive amounts of dopants.

EXAMPLE 5

The following samples were prepared according to Method A using polyester fabric and p-toluenesulfonic acid as the dopant.

| Run Number | Amount of Dopant | Resistance Ohms/Square |
| --- | --- | --- |
| 33 | 10% | 230 |
| 34 | 20% | 190 |
| 35 | 30% | 135 |
| 36 | 40% | 125 |
| 37 | 60% | 95 |
| 38 | 100% | 85 |

This shows the typical performance of an aromatic sulfonic acid dopant showing a decrease of resistance with increased amounts of doping.

EXAMPLE 6

This sample was prepared according to Method A but with a molar amount of sulfosalicylic acid in respect to $FeCl_3$ to prevent overly rapid polymerization of pyrrole according to Kuhn et al., U.S. Pat. No. 4,877,646.

| Run No. | Dopant Used | Amount of Dopant (wt % based on wt. of fabric) | Resistance Ohms/Sq. | Stability $R_o/R_x$ |
| --- | --- | --- | --- | --- |
| 39 | Anthraquinone sulfonic acid | 10% | 55 | .67 |

The results clearly show excellent conductivity and stability in the presence of a weak complexing agent for ferric ions.

There are, of course, many alternate embodiments and modifications which are intended to be included within the scope of the following claims.

What I claim is:

1. An electrically conductive textile material which is the product of the process comprising contacting in an aqueous solution said textile material, an oxidatively polymerizable pyrrole compound, an oxidizing agent capable of oxidizing said pyrrole compound to a polymer, and anthraquinone-2-sulfonic acid in an amount sufficient to impart electrical conductivity to said polymer, wherein said contacting is carried out under conditions under which said pyrrole compound and said oxidizing agent react with each other to form a prepolymer in said aqueous solution before either said pyrrole compound or said oxidizing agent are deposited or adsorbed on said textile material, but without forming a polymer per se in said aqueous solution; adsorbing onto the surface of said textile material said forming polymer and allowing said adsorbed forming polymer to polymerize in an ordered configuration while adsorbed on said textile material so as to uniformly and coherently cover said textile material with a conductive, ordered film of said polymer.

2. A material according to claim 1 wherein a weight ratio of said anthraquinone-2-sulfonic acid to said pyrrole compound present in said aqueous solution is from 1:2 to 2.5:1.

3. A material according to claim 2 wherein said pyrrole compound is present in said solution in an amount from 0.01 to 15 grams per liter.

4. A material according to claim 3 wherein said pyrrole compound is a pyrrole monomer selected from the group consisting of pyrrole, a 3- and 3,4-alkyl or aryl substituted pyrrole, N-alkyl pyrrole and N-aryl pyrrole.

5. A material according to claim 4 wherein said oxidizing agent is $FeCl_3$.

6. A material according to claim 5 wherein said textile material is a knitted, woven or non-woven fabric, and wherein the fibers of said fabric are uniformly and coherently covered with said conductive ordered film to a thickness of from about 0.05 to about 3 microns.

7. A material according to claim 6 having a resistivity of from about 10 to about 500,000 ohms per square.

8. A material according to claim 1 wherein said pyrrole compound is pyrrole.

9. A material according to claim 8 wherein said oxidizing agent is $FeCl_3$.

10. A material according to claim 9 wherein a weight ratio of said anthraquinone-2-sulfonic acid to said pyrrole compound present in said aqueous solution is from 1:2 to 2.5:1.

11. A material according to claim 10 said textile material is uniformly and coherently covered with said conductive ordered film to a thickness of from about 0.05 to about 3 microns.

12. A material according to claim 11 having a resistivity of from about 10 to about 500,000 ohms per square.

13. An electrically conductive textile material which is the product of the process comprising contacting in an aqueous solution said textile material, oxidatively polymerizable pyrrole, an oxidizing agent capable of oxidizing said pyrrole to a polymer, and anthraquinone-2-sulfonic acid, wherein a weight ratio of said anthraquinone-2-sulfonic acid to said pyrrole is between 1:2 to 2.5:1, and wherein said contacting is carried out under conditions at which said pyrrole and said oxidizing agent react with each other to form an in status nascendi forming polymer in said aqueous solution before either said monomer or said oxidizing agent are adsorbed by, or deposited on or in, said textile material, but without forming a conductive polymer per se in said aqueous solution; epitaxially adsorbing onto a surface of said textile material said in status nascendi forming polymer; and allowing the adsorbed in status nascendi forming polymer to polymerize in an ordered configuration while adsorbed on said textile material so as to uniformly and coherently cover said textile material with a conductive, ordered film of said polymer.

14. A material according to claim 13 wherein said oxidizing agent is $FeCl_3$.

15. A material according to claim 14 wherein said pyrrole is present in said solution in an amount from 0.01 to 15 grams per liter.

16. An electrically conductive textile material comprising a textile material selected from fibers, filaments, yarns and fabrics made therefrom, wherein said textile material is uniformly and coherently covered with an electrically conductive polymer film having a thickness of from 0.05 to about 3 microns, said film having been deposited on said textile material by chemical oxidation of a pyrrole compound in an aqueous solution, and wherein said polymer is doped with anthraquinone-2-sulfonic acid.

17. A material according to claim 16 wherein polymer is doped with said anthraquinone-2-sulfonic acid to provide a molar ratio of said anthraquinone-2-sulfonic acid to pyrrole compound units of from between 1:3 to 3:4.

18. A material according to claim 17 wherein said pyrrole compound is a pyrrole monomer selected from the group consisting of pyrrole, a 3- and 3,4-alkyl or aryl substituted pyrrole, N-alkyl pyrrole and N-aryl pyrrole.

19. A material according to claim 17 wherein said pyrrole compound is pyrrole.

20. A material according to claim 19 having a resistivity of from about 10 to about 500,000 ohms per square.

* * * * *